L. B. PHELPS.
Seed Planter.
No. 20,297
Patented May 18, 1858.
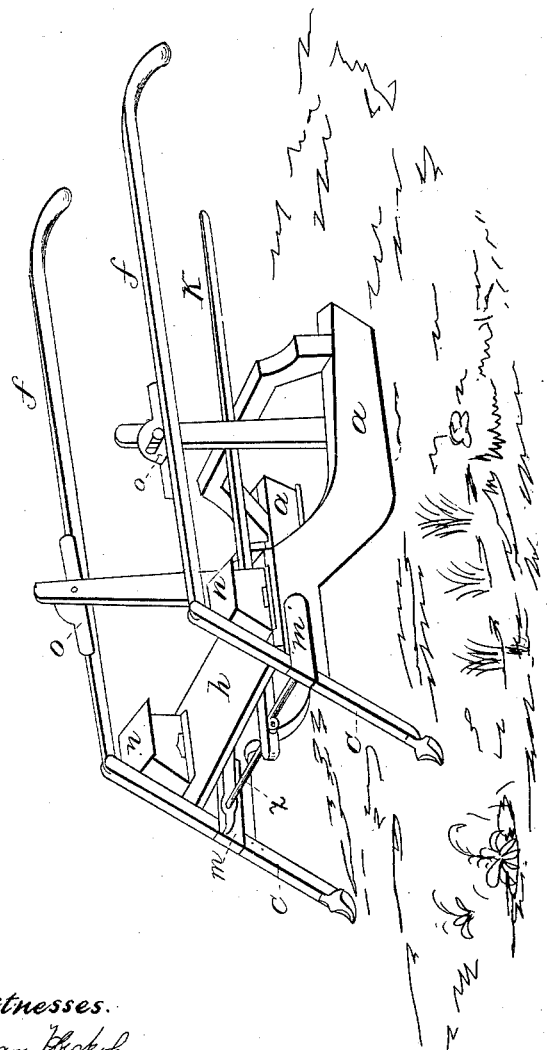

UNITED STATES PATENT OFFICE.

L. B. PHELPS, OF GENEVA, OHIO.

IMPROVEMENT IN CORN-PLANTERS.

Specification forming part of Letters Patent No. 20,297, dated May 18, 1858.

*To all whom it may concern:*

Be it known that I, L. B. PHELPS, of Geneva, in the county of Ashtabula, State of Ohio, have invented a new and useful Implement in Corn-Planting; and I do hereby declare that the following is a full, clear, and exact description of the construction and operation of the same, reference being had to the annexed drawing, making a part of this specification.

The drawing is in perspective, with lettered reference thereon.

My invention consists in constructing an implement for corn-planting with runners $a$ $a$. They are made out of two-inch plank, are from four to six inches in width, and about three feet in length. That part of runners that run upon the ground is made like a sled-runner, and is shod with iron, which should be about four inches in width. From the bow or turn the runners extend horizontally forward about one foot. The front ends are cut upon an angle of about seventy-five degrees.

The furrow-openers $c$ $c$ are adjustable, and are applied to front ends of the extended section of runners, and are held or secured there by a strap of iron bent at right angles around front ends of runners, and are firmly screwed to them.

Directly in rear of furrow-openers $c$ $c$ the seed-boxes $n$ $n$ are placed, and are fastened to board $h$, which connects the runners in front, and is four feet in length, or the required distance of the rows of seed to be planted. The rear ends of runners are connected together by a beam, as represented by drawing.

The handles $f$ $f$ are hinged to furrow-openers $c$ $c$, running back in rear of implement, provided with cams $o$ $o$, firmly bolted to handles, and are connected to two perpendicular strips or pieces of wood framed into runners by a bolt working in cam-slots, as represented by accompanying drawing.

Lever $k$ runs lengthwise of implement, and is pivoted to board $h$. The front end has a long mortise cut through it, with two rods running through it, they being connected to springs $y$ $y$, which are flat, straight springs, one end made round like a pin, bent at right angles, running through straps $m$ $m$, and into furrow-openers $c$ $c$, which have a series of gage-holes. The other ends of springs are bolted to runners, and, being connected by rolls to lever working through mortise, must be capped or provided with screw-nuts, so that when lever is worked either to the right or left, one spring-catch is thrown out from furrow-openers, while the opposite rod slides in mortise.

The objects in constructing an implement for corn-planting with runners are, they cost much less than wheels; second, they become a carriage that runs steadier and smoother over plowed and uneven ground, and for pulverizing and pressing the earth over the seed are more practical than wheels or rollers; third, the object of shoeing the runners with iron broader than runners is they must run over the furrows made by openers and not in them, as they might remove the seed.

The extended section of the runners, constructed as described, will readily be seen indispensable, for the furrow-openers and seed-boxes must be in front of the bow or turn of runners, so that the furrow can be made and seed deposited in them, and the runners passing over it pressing the earth firmly over the seed.

It will be seen that the runners will keep the general surface of the ground, and to deposit seed any required depth will be done by running the furrow-openers that distance below the runners. The arrangement of the handles being hinged to openers provided with cams and pivoted to the perpendicular strips, in combination with lever and spring-catches, the operator standing in rear of implement can set the openers any depth for drilling, raise them up clear from the ground, and make this implement as portable as a sled, simply by placing his foot against the lever and throwing the spring-catches out from openers, leaving them free to be moved by the leverage of the handles.

The object of this invention is to introduce to corn-growers a simple two-rowed implement for corn-planting that will supersede all others for cheapness and simplicity.

I do not claim to be the inventor of runners, handles, seed-boxes, or furrow-openers or drills. These are old devices, and in common use; but

What I claim, and desire to secure by Letters Patent, is—

The arrangement of the adjustable furrow-openers $c$ $c$, handles $f$ $f$, lever $k$, and spring-catches $y$ $y$ with runners $a$ $a$, the whole being constructed for joint operation, as herein described and shown.

L. B. PHELPS.

Witnesses:
S. L. PHELPS,
L. P. PHELPS.